(12) United States Patent
Senoo

(10) Patent No.: US 8,200,650 B2
(45) Date of Patent: Jun. 12, 2012

(54) REPLAY DEVICE

(75) Inventor: Junya Senoo, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 364 days.

(21) Appl. No.: 12/480,967

(22) Filed: Jun. 9, 2009

(65) Prior Publication Data

US 2009/0307197 A1    Dec. 10, 2009

(30) Foreign Application Priority Data

Jun. 10, 2008   (JP) ................................. 2008-151197

(51) Int. Cl.
*G06F 17/30* (2006.01)
(52) U.S. Cl. .......................... 707/706; 707/710; 707/740
(58) Field of Classification Search .................. 707/706, 707/710, 740
See application file for complete search history.

(56) References Cited

U.S. PATENT DOCUMENTS

2007/0174471 A1 *   7/2007   Van Rossum ................. 709/229

FOREIGN PATENT DOCUMENTS

| EP | 1 865 414 A | 12/2007 |
|---|---|---|
| JP | 2006-228201 | 8/2006 |
| WO | WO-2009-044341 A | 4/2009 |

OTHER PUBLICATIONS

Kirk McElhearn,The Complete Guide to i Tunes? Podcasts, Internet Citation, pp. 1-10.

* cited by examiner

*Primary Examiner* — Baoquoc To
(74) *Attorney, Agent, or Firm* — Pillsbury Winthrop Shaw Pittman, LLP

(57) ABSTRACT

From when any one of several DMSs 2 is selected, until contents are downloaded from that DMS 2, a DMP 1 stores the search information which has been specified for that DMS 2. And if some other DMS 2 is selected before contents have been downloaded from the DMS 2 which was first selected, then the DMP 1 specifies this search information which is stored to that other DMS 2. Accordingly, it is possible greatly to enhance the ease of use when it is not known upon which DMS 2 the desired contents is stored.

3 Claims, 9 Drawing Sheets

FIG.4

PROPERTY EXPRESSION TABLE

| Music | música | Musik | ● ● ● ● |
|---|---|---|---|
| Genre | género | | ● ● ● ● |
| Rock | Rock la música | | ● ● ● ● |
| ● ● ● ● ● ● ● ● ● ● ● ● ● ● ● ● ● ● ● ● ● ● ● | | | |

REPLAY DEVICE

CROSS REFERENCE

This Nonprovisional application claims priority under 35 U.S.C. §119(a) on Patent Application No. 2008-151197 filed in Japan on Jun. 10, 2008, the entire contents of which are hereby incorporated by reference.

BACKGROUND OF THE INVENTION

The present invention relates to a replay device which downloads and replays contents stored by a server device which has been selected from among a plurality of server devices.

In the prior art, the so-called "Digital Living Network Alliance" system has become widespread. In this DNLA, a replay device is connected to a plurality of server devices via a router or the like. Generally, such a replay device is termed a Digital Media Player (DMP). Furthermore, the server devices are termed Digital Media Servers (DMS). Contents are stored upon each of the server devices. Furthermore, each of the server devices classifies and manages the contents which it stores by various classification categories, and by properties of these classification categories. The user is able to select any one of the server devices with the replay device, and to search upon the selected server device for contents by specifying the type of the classification category and a property of that classification category. And the user downloads the desired contents which he has found from the server device to his replay device, and replays that contents with his replay device.

Accordingly, without being conscious of the location of installation of a personal computer or a hard disk recorder or the like which functions as a DMP, the user of DNLA is able to actuate an AV device or the like which functions as a DMP, and to replay and view contents stored upon a DMS with a DMP.

Furthermore, even if there is no definite current demand from a user, a device which can select an appropriate forwarding address for processing such a demand has been proposed (in Japanese Laid-Open Patent Publication 2006-228201). With this device, classification information is stored which establishes correspondence between classification categories into which data description objects are classified in a hierarchical manner, and forwarding addresses. Furthermore, with this device, when a notification of non-processing is received from a forwarding address to which has been forwarded a user demand which has been received, then the classification information which is stored is searched, and the classification category of this forwarding address from which this notification of non-processing has been transmitted and has arrived is acquired. And, using this classification category which has thus been acquired, a forwarding address is inferred for which the possibility is high that the demand of the user can be processed, and this forwarding address is taken as the new forwarding address for received data. With this device, the user demand which has been received is re-transmitted to the new forwarding address.

However if, without being aware that a DMS is currently selected upon which the contents are not stored, the user searches for contents which he desires while specifying the type of classification category and a property thereof to such a DMS, then, when he realizes that the desired contents are not stored upon the DMS which is selected, he comes to select a different DMS. With a DMP according to the prior art, searching of contents which is performed while designating the type of classification category and a property of this classification category is only valid for the DMS which is selected at that time point. Due to this, when searching upon a different DMS from the one which has been selected this time, the user is required to repeat the designation of a similar type of classification category and property thereof. In particular, when the user does not know upon which DMS the contents which he desires are stored, sometimes he repeats selection of a new DMS as many times as he desires, and in such a case, each time he selects a new DMS, it becomes necessary for him to repeat the designation of the type of classification category and its property. Accordingly, there has been the problem from the point of view of the user that the ease of use is not good.

The object of the present invention is to provide a replay device which enhances the ease of use when searching for and replaying desired contents from among a plurality of server devices upon which contents are stored.

SUMMARY OF THE INVENTION

With the replay device of the present invention, a server device selection means selects any one server device from among a plurality of server devices. Each of the server devices stores contents, and classifies and manages contents which it stores according to classification categories of a plurality of types and properties of these classification categories. A search information specification means specifies, to a server device which has been selected by said server device selection means, as search information, a type of classification category of contents to be searched and/or a property of that classification category. The server device restricts, i.e. narrows down, the contents which it stores, using the type of classification category of contents which has been designated, and/or its properties. And a search result acquisition means acquires, from the server device which is selected at this time point, a title or titles of contents found according to one or a plurality of items of search information specified by said search information specification means. A display means displays the title or titles of contents acquired by said search result acquisition means as a list, and, when the title of any one of these contents has been selected, a replay means downloads the corresponding contents from the server device which is selected at this time point, and replays said contents.

Moreover, from when some one of the server devices is selected by said server device selection means until the downloading by said replay means of contents from the server device which is selected at this time point, a search information storage means cumulatively stores search information which has been specified for the selected server device by said search information specification means. And, when some other server device is selected by said server device selection means before said replay means downloads contents from the server device selected at this time point, a collective specification means specifies to said other server device the search information which is stored in said search information storage means.

In this manner, with the replay device of the present invention, when, before contents are downloaded from the server device which is selected, some other server device is selected, then the classification category specified to the server device which was first selected and its properties are automatically specified to this other server device. Accordingly, it is possible to enhance the ease of use when searching and replaying desired contents from among a plurality of server devices on which contents are stored. In particular, it is possible greatly to enhance the ease of user of a user who does not know upon which server device the contents which he desires are stored.

Moreover, with regard to said collective specification means, it is desirable for it to be adapted to decide, for each item of search information stored in said search information storage means, whether or not it can be specified to some other server device which has been selected this time, and to specify only that search information which can be specified to said other server device which has been selected this time. In other words, it is desirable to provide a structure in which search information which cannot be specified to the other server device which has been selected this time is not actually specified. Such search information which cannot be specified is search information by a classification category or by a property thereof which is not used by the other server device which has been selected this time for managing its contents. Due to this, inappropriate search information is not specified to that other server device, so that it is possible to prevent the occurrence of search errors or the like.

And, with regard to classification categories and properties used for classifying and managing contents, there may be provided a table storage means which stores a property expression table in which expressions which are considered to be the same are kept in mutual correspondence; and, moreover, said collective specification means may be built as a means which decides, on the basis of the stored contents of said table storage means, whether or not it is possible to specify search information stored in said search information storage means to said other server device which has been selected this time. If this is done, then designation of types of classification categories or properties may be performed in an adequate manner to the other server device which has been selected, even if the expressions for classification categories or properties are different between the different server devices, provided that these servers actually manage their contents with classification categories or properties which are substantially the same.

BRIEF DESCRIPTION OF THE DRAWINGS

FIG. 4 is a figure showing a property expression table.

DETAILED DESCRIPTION OF THE INVENTION

Figure 1:
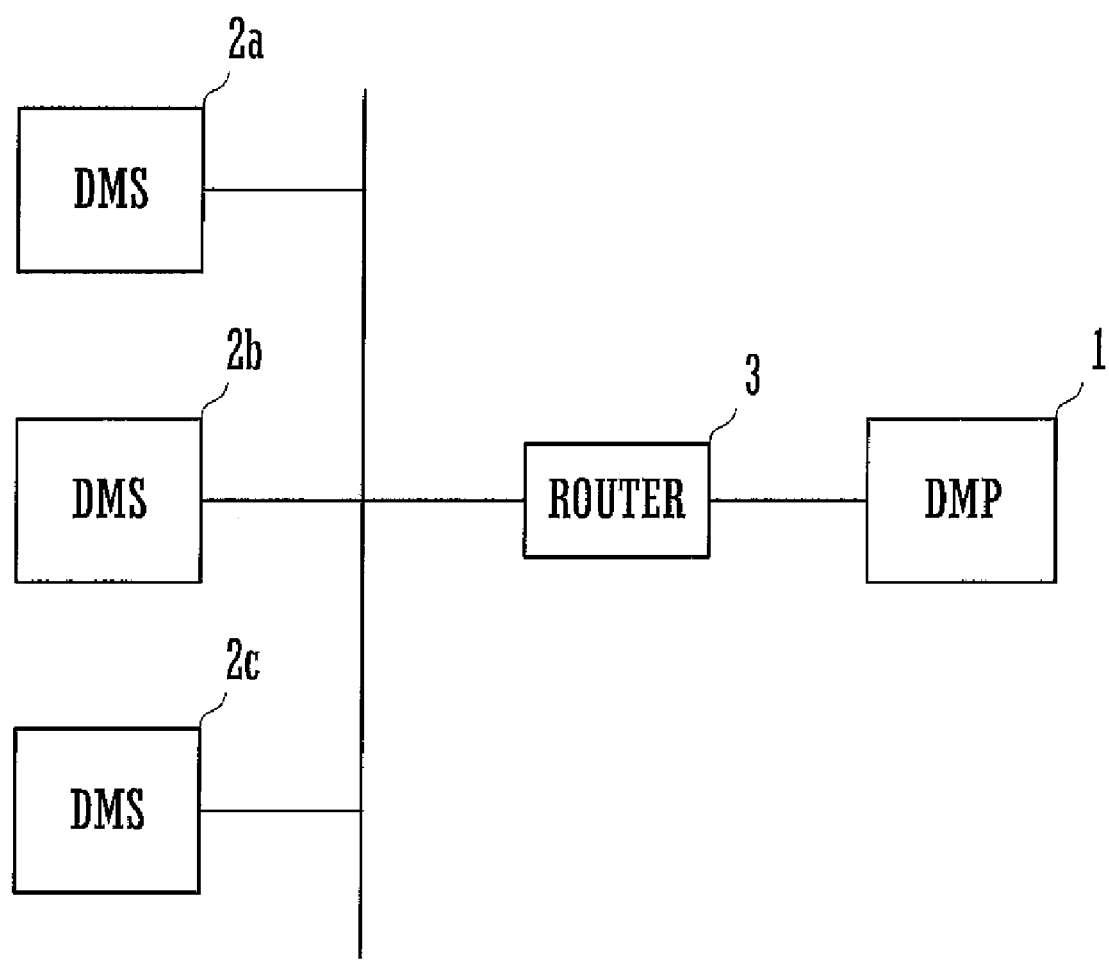
FIG. 1 is a figure showing a DNLA.

FIG. 1 is a figure showing a network according to the Digital Living Network Alliance concept. In DNLA, as shown in FIG. 1, a Digital Media Player 1 is connected to a plurality of Digital Media Servers 2 (2a, 2b, and 2c) via a router 3. The Digital Media Player 1 (DMP 1) is a replay device according to an embodiment of the present invention. And the Digital Media Servers 2 (DMS 2) correspond to the server devices mentioned in the Claims of this application. The router 3 is a relay device which relays communication between the DMP 1 and the DMSs 2. Since the router 3 is per se conventional, explanation thereof will herein be omitted.

It should be understood that, although three of the DMSs 2 are shown in FIG. 1, any number of the DMSs 2 would be acceptable.

Figure 2:
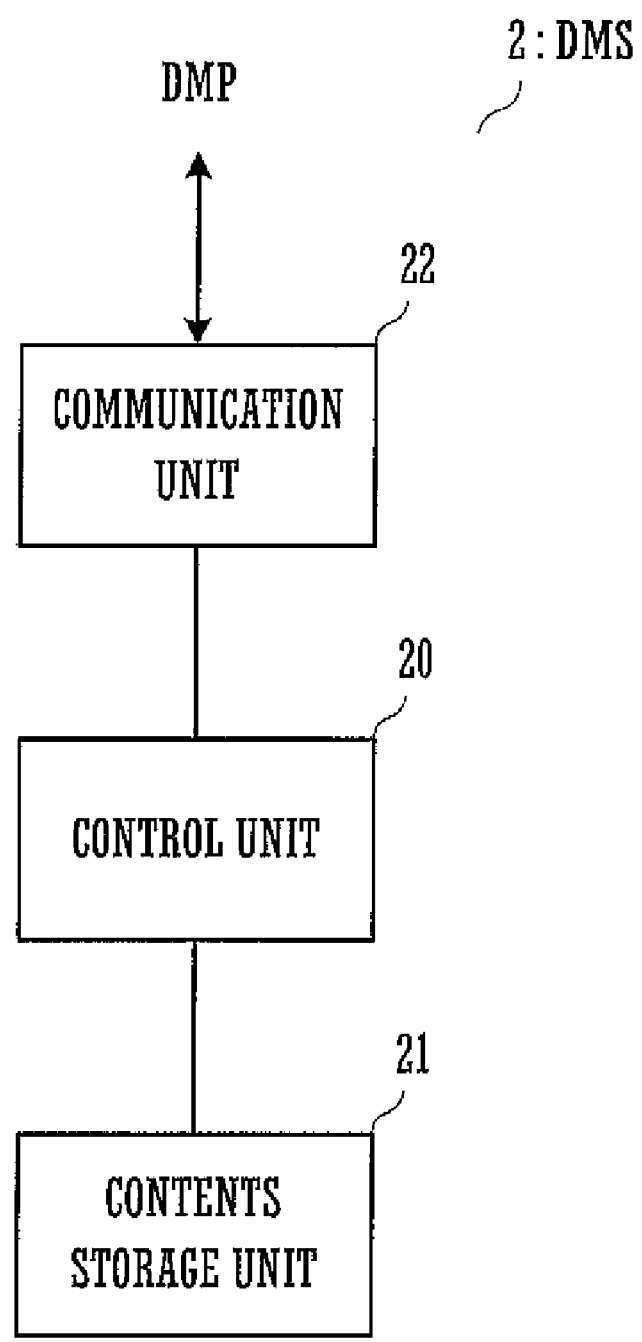
FIG. 2 is a block diagram showing the structure of the main portion of a DMS.

The DMSs 2 are, for example, personal computers or hard disk recorders. As shown in FIG. 2, each DMS 2 comprises a control unit 20, a contents storage unit 21, and a communication unit 22. The control unit 20 controls the operation of the various sections of the main body of the DMS 2. The contents storage unit 21 is a hard disk or a non-volatile storage medium such as a memory card or the like, and stores contents. And the communication unit 22 controls communication with the DMP 1.

Each of the DMSs 2 classifies and manages the contents which it stores according to classification categories of a plurality of types, and properties thereof. Due to this, searching of the contents stored in this DMS 2 may be performed by specifying a classification category and its properties to the DMS 2. Here what is meant by a classification category is, for example, the contents type, the contents genre, the contents artist, or the like. And type properties of the contents may be "photograph", "video", "music" or the like. Moreover, in the case of music, genre properties of the contents may be "pop", "rock", "classic", "jazz" or the like. And, in the case of music, artist name properties of the contents may be the name of a singer or the name of a group or the like. The DMS 2 may store management information used for managing its stored contents in the contents storage unit 21, or may store it in a memory not shown in the figures, or the like.

Furthermore, although substantially the same classification categories and properties may be utilized in common between a plurality of DMSs 2, sometimes it happens that the ways in which they are expressed are different. For example while, on one DMS 2, a contents type property may be expressed as "music", on some other DMS essentially the same concept may be expressed as "música", and on yet another DMS essentially the same concept may be expressed as "Musik". And, in the case of classification categories, for example, on one DMS 2 "Genre" may be used, while on another DMS 2 "gégenero" may be used, although these different expressions mean substantially the same thing.

The DMSs 2 are endowed with a function of, when one or a plurality of classification categories are specified from the DMP 1, notifying the titles of contents which are classified by their properties as search results to the DMP 1. Furthermore, the DMP 1 is endowed with a function of downloading from the DMSs 2 contents the title of which has been specified, and of replaying those contents.

Figure 3:
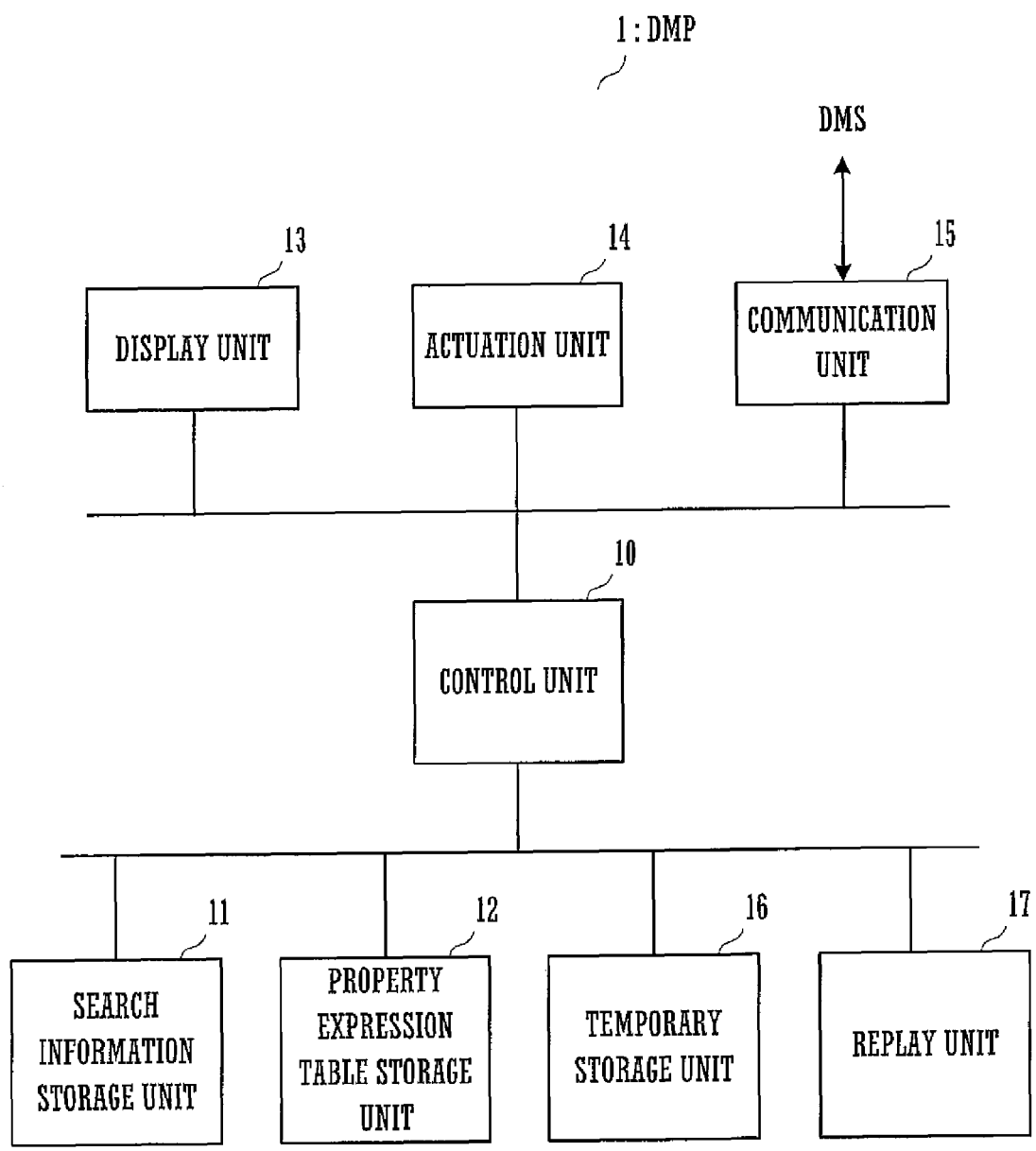
FIG. 3 is a block diagram showing the structure of the main portion of a DMP.

Next, the structure of this DMP 1 will be explained. FIG. 3 is a block diagram showing the structure of the main portion of the DMP 1. This DMP 1 comprises a control unit 10, a search information storage unit 11, a property expression table storage unit 12, a display unit 13, an actuation unit 14, a communication unit 15, a temporary storage unit 16, and a replay unit 17. The control unit 10 controls the operation of the various sections of the main body of the DMP 1. The search information storage unit 11 temporarily stores, as search information, the type of the classification category specified to the DMS 2, and its properties. The property expression table storage unit 12 stores a property expression table in which are held correspondences between classification categories and expression of properties which are substantially the same, as shown by way of example in FIG. 4. As described above, in this property expression table, there are stored: a record in which a correspondence is established between "music", "música", and "Musik"; a record in which a correspondence is established between "Genre" and "género"; and a record in which a correspondence is established between "Rock" and "Rock la música". In FIG. 4, expressions of classification categories and properties which have substantially the same meaning are contained within the same line of the table.

The display unit 13 displays, upon a display device, actuation guidance screens which specify types of properties and their classification categories for the DMSs 2, and search results for the DMSs 2 and so on. The actuation unit 14 receives input actuation from the user. The communication unit 15 performs communication with the DMSs 2 via the router 3. The temporary storage unit 16 temporarily stores data for contents which have been downloaded from a DMS 2. And the replay unit 17 replays contents which are stored in the temporary storage unit 16, in other words contents which have been downloaded from a DMS 2.

Figure 5:
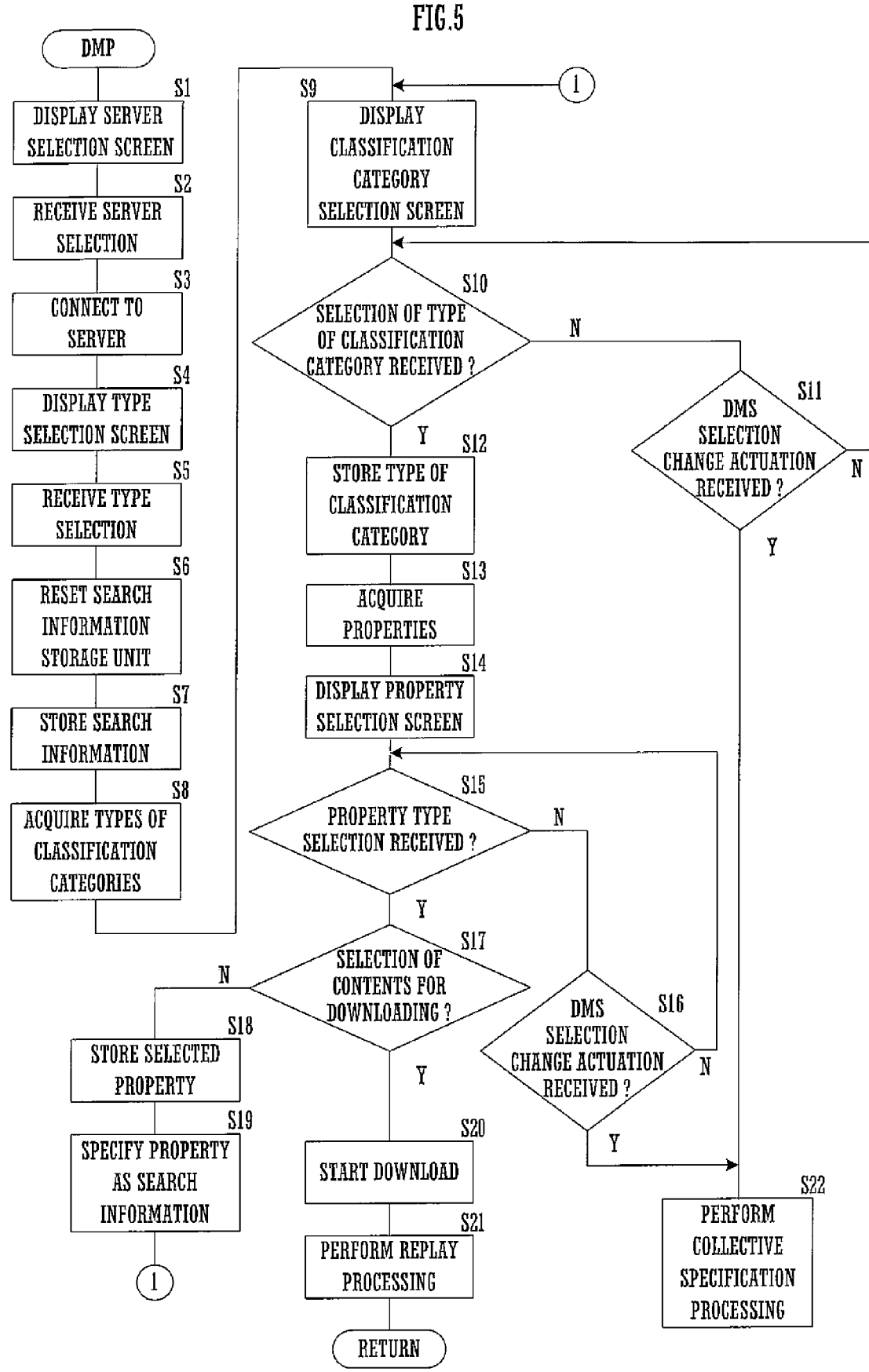
FIG. 5 is a flow chart showing the operation of a DMP.
Figure 6A:
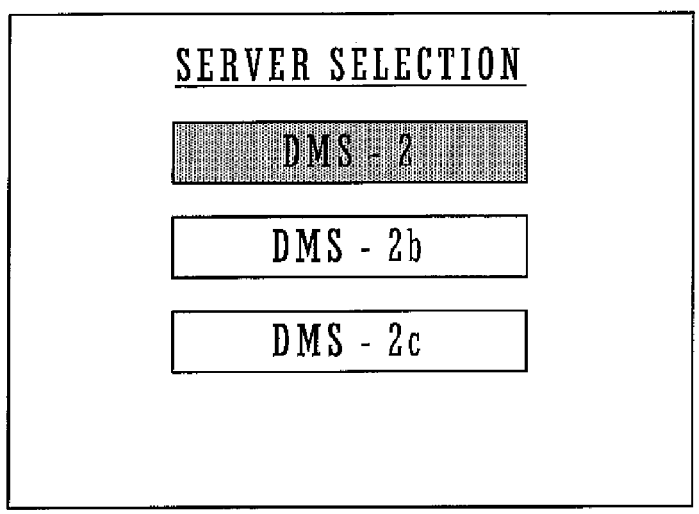
FIG. 6(A) is a figure showing an example of a display screen of a DMP.
Figure 6B:
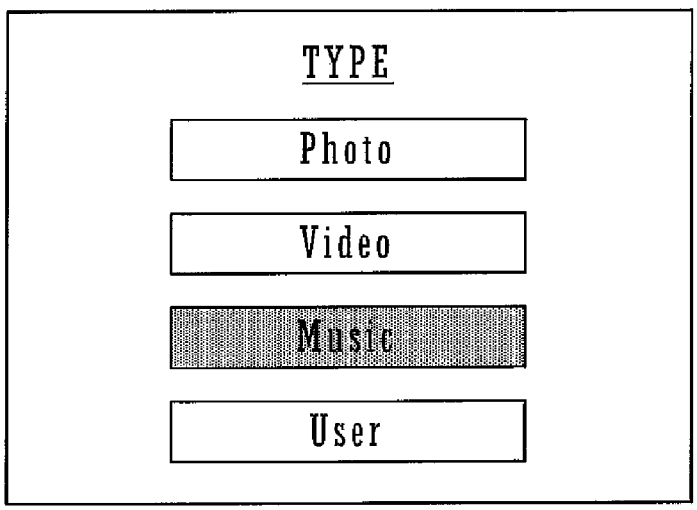
FIG. 6(B) is a figure showing another example of a display screen of a DMP.

Next, the operation of this DMP 1 will be explained. FIG. 5 is a flow chart showing the operation of the DMP 1. Initially, this DMP 1 displays upon the display unit 13 a server selection screen (refer to FIG. 6(A)) for selection of a DMS 2 to be connected to via the router 3 (a step S1), and then it receives server selection actuation by the user via the actuation unit 14 (a step S2). In the step S1, the DMSs 2 to which connection can be established via the router 3 are displayed as a list. The user actuates a scroll key or the like which is provided upon the actuation unit 14 to set a cursor to the DMS 2 which he wishes to select, and then actuates a confirm key. When the confirm key has been actuated, the DMP 1 decides that the DMS 2 to which the cursor is set has been selected, and connects to this DMS 2 via the router 3 (a step S3). And, after having established this connection to the DMS 2 in the step S3, the DMP 1 acquires the contents type properties which are used by this DMS 2 for management of its contents, and displays upon the display unit 13 a type selection screen as shown in FIG. 6(B) (a step S4). In FIG. 6(B), an example is shown in which the DMS 2 which is selected at this time point performs classification and management of contents with type properties of four types—"Photo", "Video", "Music", and "User".

Then the DMP 1 receives selection actuation by the user via the actuation unit 14 for the type of contents (a step S5). In this case as well, the user actuates the scroll key or the like which is provided upon the actuation unit 14, sets the cursor to the type of contents which he wishes to select, and actuates the confirm key. And, upon receipt of this selection actuation from the user for the contents type, the DMP 1 resets the search information storage unit 11 (a step S6), and stores in the search information storage unit 11, as search information, the classification category (here, the type of contents) for which selection has been received this time, and its property (for example "Music"), in mutual correspondence (a step S7). Moreover, the DMP 1 specifies to the DMS 2 which is selected at this time point, as search information, the type of contents which is selected at this time.

Figure 6C:
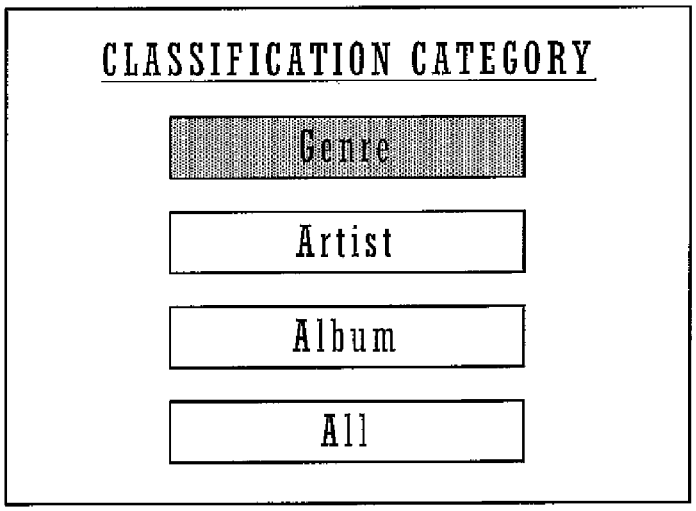
FIG. 6(C) is a figure showing yet another example of a display screen of a DMP.

Furthermore, for contents of the type which is selected this time (for example, for "Music" contents), the DMP 1 acquires the types of the classification categories of the contents classified and managed by the currently connected DMS 2 (a step S8), and displays a classification category selection screen as shown in FIG. 6(C) upon the display unit 13 (a step S9). And, on the basis of the search information specified from the DMP 1, the DMS 2 performs restriction (i.e. narrowing down) search processing for contents stored in the contents storage unit 21. In FIG. 6(C), a case is shown by way of example in which "Music" has been selected as the contents type. Moreover, the DMS 2 which is selected at this time point manages contents which fall under "Music" by the three classification categories "Genre", "Artist", and "Album". Furthermore, "Genre" takes the fields "POP", "Rock", "Classic", "Jazz" and so on as properties. "Artist" has the names of singers and groups and so on of the stored contents as properties. And "Album" has the names of albums of the stored contents as properties. Here, the contents which the DMP 1 downloads from the DMS 2 are album units.

The DMP 1 waits either for receipt of selection actuation by the user via the actuation unit 14 of a type classification category of contents (a step S10), or for reception of selection change actuation for the DMS 2 (a step S11). If the user wishes to select a type of classification category for contents, then he actuates the scroll key or the like provided upon the actuation unit 14, sets the cursor to the type of classification category of contents which he desires, and then actuates the confirm key. And, if he wants to perform selection change actuation for the DMS 2, then he actuates a DMS selection change key which is provided upon the actuation unit 14.

Figure 7A:
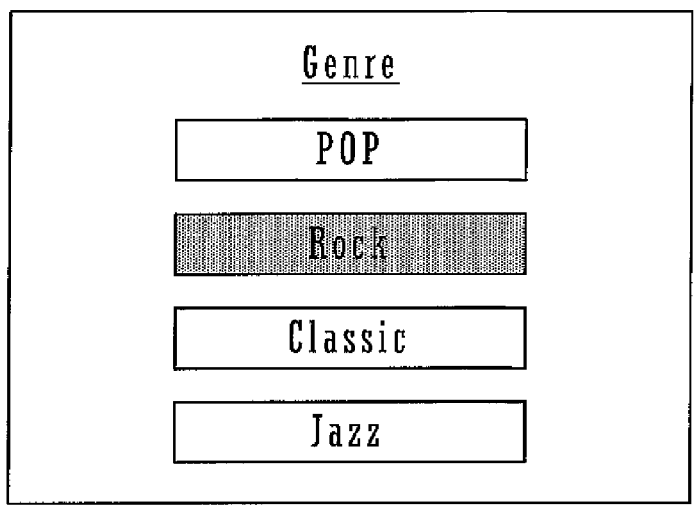
FIG. 7(A) is a figure showing still another example of a display screen of a DMP.
Figure 7B:
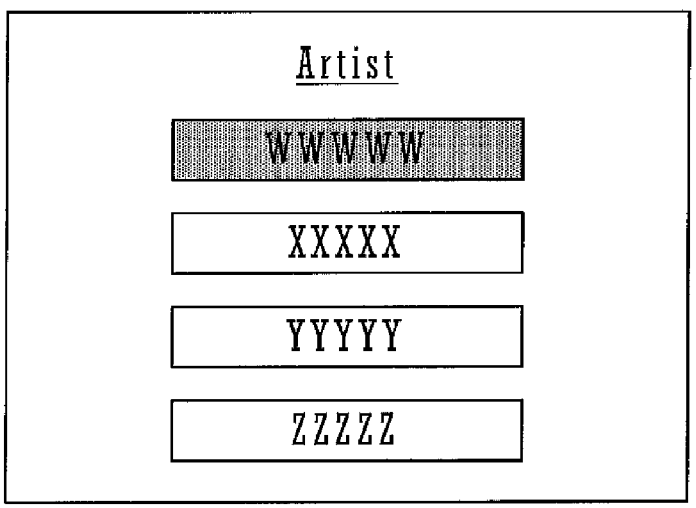
FIG. 7(B) is a figure showing still yet another example of a display screen of a DMP.
Figure 7C:
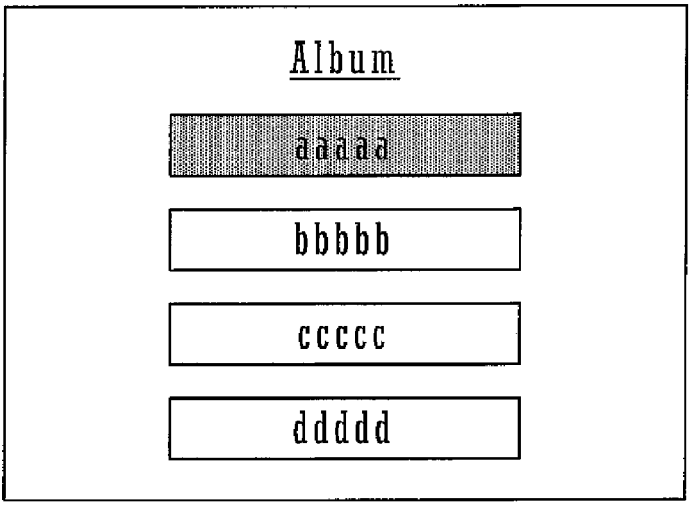
FIG. 7(C) is a figure showing a yet further example of a display screen of a DMP.

When the DMP 1 receives selection actuation by the user for a type of classification category for contents, then it adds the type of classification category which is selected this time into the search information storage unit 11 and stores it (a step S12). Moreover, it acquires the properties of the classification category which is selected this time from the DMS 2 (a step S13), and displays the property selection screen shown in FIG. 7 upon the display unit 13 (a step S14). FIG. 7(A) is a property selection screen when "Genre" has been selected; FIG. 7(B) is a property selection screen when "Artist" has been selected; and FIG. 7(C) is a property selection screen when "Album" has been selected.

It should be understood that, when "Album" has been selected, if specification of a property for "Genre" or "Artist" has already been performed, then only names of albums which belong to the property of "Genre" or "Artist" already specified are displayed.

The DMP 1 waits either for receipt of property selection actuation by the user via the actuation unit 14 of the DMS 2 (a step S15), or for reception of selection change actuation for the DMS 2 (a step S16). Upon receipt of property selection actuation by the user via the actuation unit 14, the DMP 1 decides (a step S17) whether or not the selection this time is one which selects contents to be downloaded from the DMS 2. Here, the unit of contents to be downloaded from the DMS 2 is an item which is classified as "Album". To put this in another manner, when "Album" is selected as the classification category, and any one of the properties (album or title) has been selected, then it is decided that the selection at this time is a selection of contents to be downloaded from the DMS 2.

If it is decided that the selection at this time is not a selection of contents to be downloaded from the DMS 2, then the DMP 1 adds the property which has been selected this time into the search information storage unit 11 and stores it (a step S18). In this step S18, this property which has been selected this time is set to correspond to the classification category of the corresponding type which was first stored. Moreover, the property which has been selected this time is specified to the DMS 2 as search information (a step S19), and then the flow of control returns to the step S10.

The DMS 2 narrows down the contents which are stored in the contents storage unit 21 according to the search information is from the DMP 1.

If, in the step S17, it is decided that the selection at this time is a selection of contents to be downloaded from the DMS 2, then the DMP 1 starts to download the contents which are selected this time (a step S20). And the DMP 1 stores the data for contents which is downloaded from the DMS 2 in the temporary storage unit 16. Moreover, the DMP 1 performs replay processing for the contents downloaded from the DMS 2 with the replay unit 17 (a step S21). It may be arranged to perform this replay processing while the contents is still being downloaded from the DMS 2, or alternatively to start this replay processing after the downloading of the contents has been completed.

Figure 8:
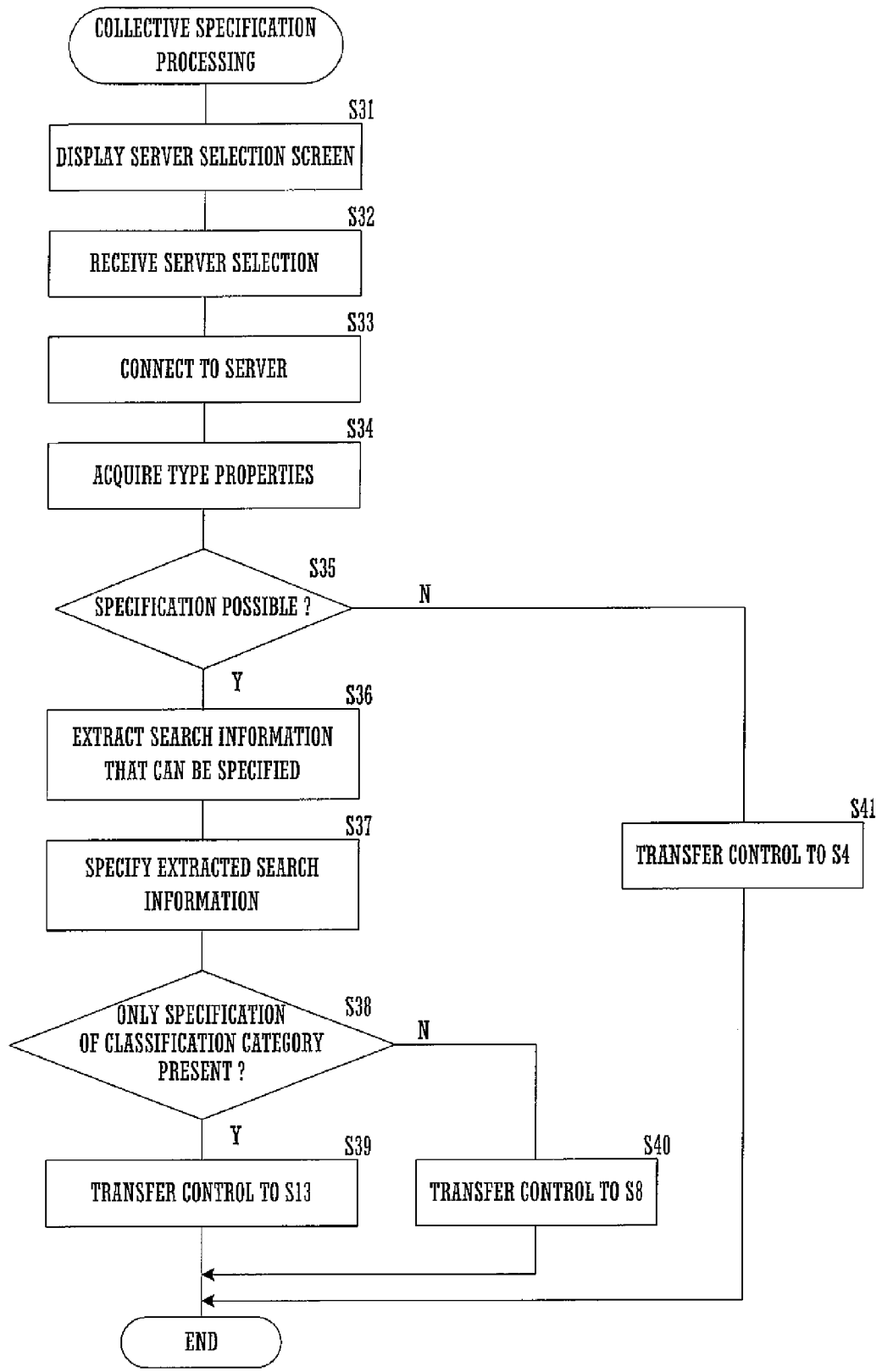
FIG. 8 is a flow chart showing processing by a DMP for specifying properties all together.

Furthermore, upon receipt of DMS selection change actuation in the step S11 or the step S16, the DMP 1 performs collective specification processing (a step S22). FIG. 8 is a flow chart showing this collective property specification processing.

The DMP 1 displays upon the display unit 13 a server selection screen for selecting a DMS 2 to be connected to via the router 3 (a step S31), and receives selection actuation for a DMS 2 by the user via the actuation unit 14 (a step S32). For receiving this selection actuation for a DMS 2 in the step S31, it would be acceptable to display the screen shown in FIG. 3(A), or alternatively it would also be acceptable to display a different screen not shown in the figure. When a DMS 2 has been selected, the DMP 1 connects to this DMS 2 which is being selected at this time via the router 3 (a step S33), and acquires, from this DMS 2 which is connected at this time, the contents type properties used by this DMS 2 for managing its contents (a step S34). And the DMP 1 decides (a step S35) whether or not the DMS 2 which is connected at this time can perform specification with the contents type properties which are stored in the search information storage unit 11 (in other words, with the contents type properties which were specified in relation to the DMS 2 which was first selected). Thus, in this step S35, a decision is made as to whether or not, among the contents type properties acquired in the step S34, there are expressions which are the same, or substantially the same, as the contents type properties which are stored in the search information storage unit 11. Expressions which are substantially the same may be acquired from the property expression table. Accordingly specification of search information to the DMS 2 which is selected this time can be performed in an adequate manner, even though the expressions of some contents type property such as "Music", "música", and "Musik" may be different between the DMS 2 which was first selected and the DMS 2 which was selected this time.

If the DMS 1 decides in the step S35 that specification of the contents type property cannot be performed, then the flow of control is transferred to the step S4 (a step S41).

If it is decided in the step S35 that specification of the contents type property can be performed, then the DMP 1 extracts, from among the search information stored in the search information storage unit 11, that search information which can be specified to the DMS 2 which is connected at this time (a step S36). In this step S36, for search information to which the classification category and its properties are in correspondence, the DMS 2 which is connected at this time decides that specification is possible, if it manages its contents with expressions which are both the same, or are both substantially the same. Conversely, for search information for even one item of which the expression is not the same or substantially the same, then a decision is made that specification is impossible. Moreover, for search information only consisting of a classification category, if it is not search information for which it has been decided that specification is impossible, then it is decided that specification is possible; and, conversely, if it is search information for which it has been decided that specification is impossible, then it is decided that specification is impossible.

It should be understood that, if only the expression for the search information for the classification category is not the same, or substantially the same, then it is decided that specification is impossible.

Then the DMP 1 specifies the search information which was extracted in the step S36 to the DMS 2 which is connected at this time (a step S37).

Accordingly the search information which was specified to the DMS 2 which was selected first, can be specified in an adequate manner to the DMS 2 which has been selected this time. Moreover, even if the classification category or the expression of its property is different, if it is substantially the same, it is possible to specify this search information to the DMS 2 which is selected at this time. Furthermore, since search information which cannot be specified is not specified, accordingly it is possible to prevent the occurrence of search errors or the like from taking place.

If search information which consists only of a classification category is specified to the DMS 2 which is connected at this time, then the flow of control in the DMP 1 is transferred to the step S13 (steps S38 and S39). The properties which appertain to such search information consisting only of a classification category which has been specified at this time, are acquired from the DMS 2 which is connected at this time. Moreover, if search information which consists only of a classification category is not specified to the DMS 2 which is connected at this time, then the flow of control in the DMP 1 is transferred to the step S8 (steps S38 and S40).

It should be understood that classification categories for which properties have already been set are not displayed upon the display unit 13 in the step S9. Accordingly, the user is not required to reselect a classification category for which a property has been specified in the step S37 for a second time.

Figure 9A:
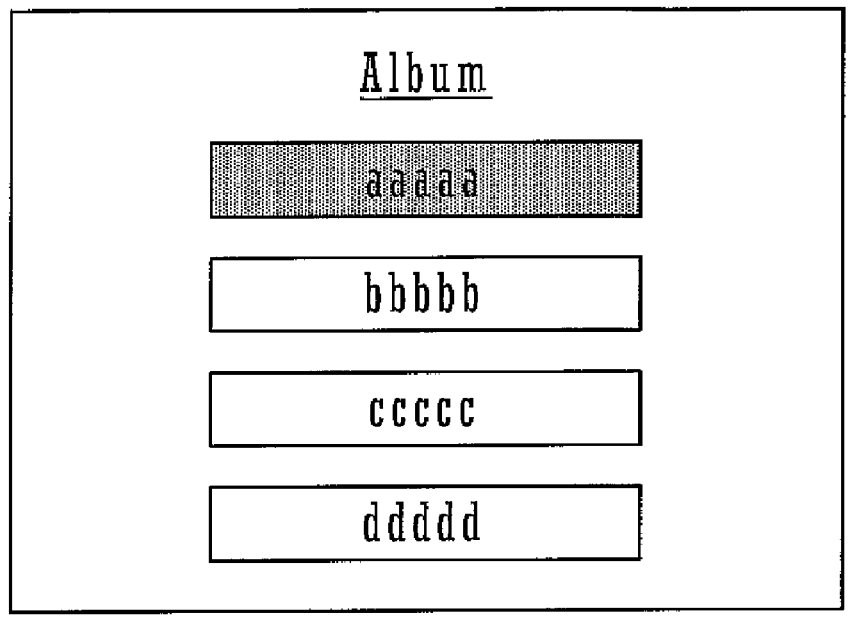
FIG. 9(A) is a figure showing another example of a display screen of a DMP.
Figure 9B:
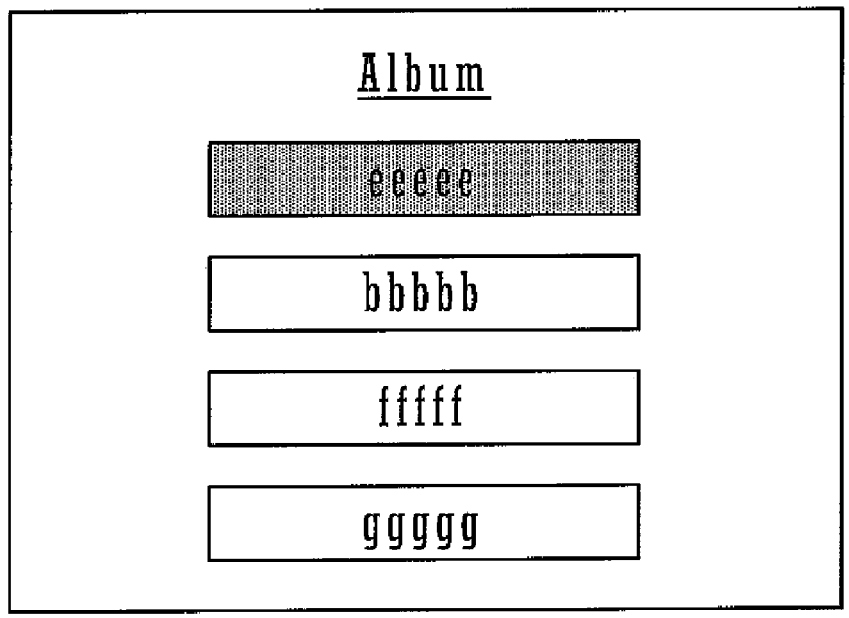
FIG. 9(B) is a figure showing even yet another example of a display screen of a DMP.

Due to this, even if the user is not aware that a DMS 2 upon which the contents which he desires are not stored is selected, and searches for his desired contents while specifying a type of classification category and a property thereof to that DMS 2, then, when he becomes aware that the desired contents are not stored upon the DMS 2 which is selected, and has selected a different DMS 2, it is not necessary for him to repeat the specification of that type of classification category or its properties to the DMS 2 which was first selected. For example, if he searches for contents with search information consisting of "Music" as a contents type, with the "Genre" property being "Rock", and with the "Artist" property being "WWWWW", and when he selects "Album" and, due to the display on the display unit 13 (refer to FIG. 9(A)), he becomes aware that the contents "eeeee" which he desires is not stored upon the DMS 2 which is selected at this time point, then, when he selects some other DMS 2, it is possible automatically to obtain search results with the same search information for this other DMS 2 which is selected at this time (refer to FIG. 9(B)). Here, it is supposed as a premise that the management of the contents on the two DMSs 2 is substantially the same. Accordingly, it is possible to enhance the ease of use from the point of view of the user.

Finally, all of the features of the embodiment described above are only given by way of example, and are not to be considered as being limitative of the present invention in any way. The range of the present invention is not defined by the embodiment described above, but rather by the scope of the following Claims. Moreover, it is intended that all changes, alterations, additions, and omissions to the embodiment described which still fall within the properly interpreted meaning and scope of the Claims are still to be included within the range of the present invention.

What is claimed is:

1. A replay device, comprising:

server device selection means which selects any one server device from among a plurality of server devices which classify and manage stored contents with classification categories of a plurality of types and properties of these classification categories;

search information specification means which specifies as search information, to a first server device which has been selected by the server device selection means, a type and/or a property of classification category of contents to be searched;

search result acquisition means which acquires, from the first server device, a title or titles of contents found according to the search information specified by the search information specification means;

display means which displays the title or titles of contents acquired by the search result acquisition means as a list;

replay means which, when the title of some contents displayed by the display means has been selected, downloads the corresponding contents from the first server device, and replays the contents;

search information storage means which, from when the server device selection means selects the first server device until the replay means downloads contents from the first server device, cumulatively stores the search information which has been specified for the first server device; and a collective specification means which, when a second server device is selected by the server device selection means before the replay means downloads contents from the first server device, decides whether or not each item of the search information stored in the search information storage means can be specified to the second server device, and specifies to the second server device only the search information which can be specified.

2. The replay device as described in claim 1, further comprising table storage means which, for classification categories and properties used for classifying and managing contents, stores a property expression table in which expressions which are considered to be the same are kept in mutual correspondence, wherein the collective specification means decides, on the basis of the stored contents of the table storage means, whether or not the search information stored in the search information storage means can be specified to the second server device.

3. The replay device as described in claim 1, wherein the search result acquisition means acquires, from the second server device, a title or titles of contents corresponding to the search information specified by the collective specification means, wherein the display means displays, as a list, titles of contents acquired by the search result acquisition means, and wherein the replay means, when a title of some contents displayed by the display means is selected, downloads the corresponding contents from the second server device, and replays the contents.

* * * * *